H. PEDRETTI.
ASEPTIC INSTRUMENT CASE.
APPLICATION FILED OCT. 27, 1914.
1,149,941.
Patented Aug. 10, 1915.
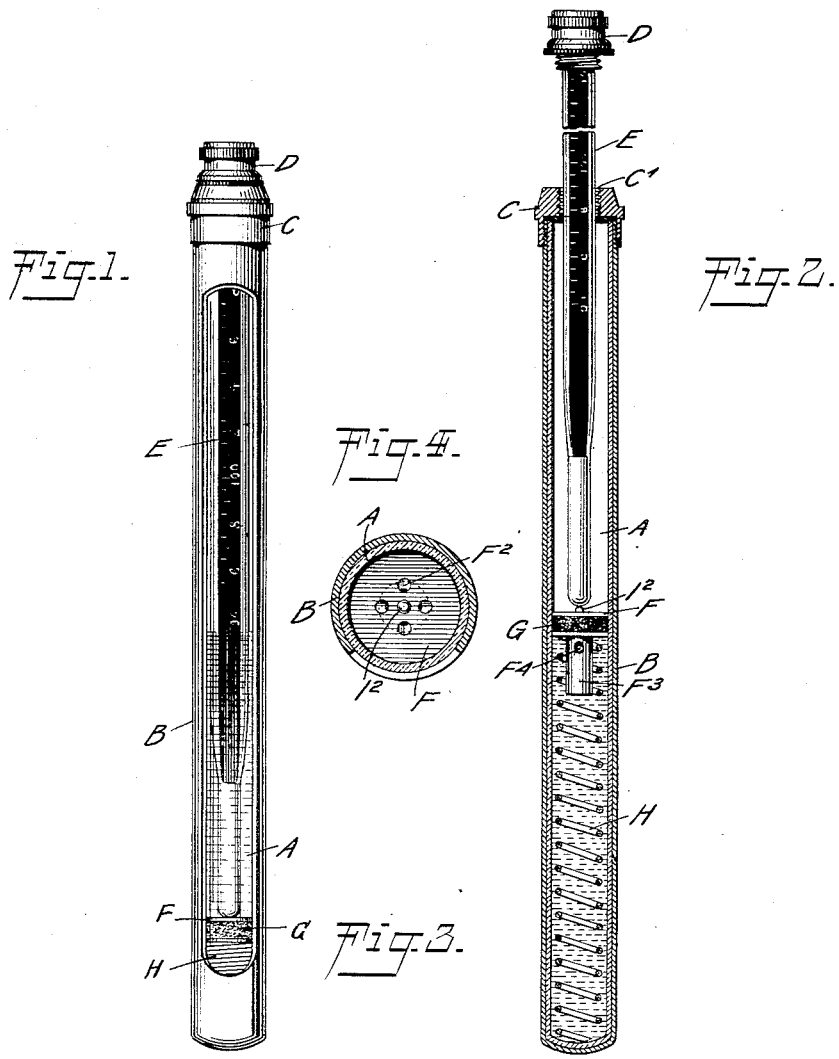
WITNESSES
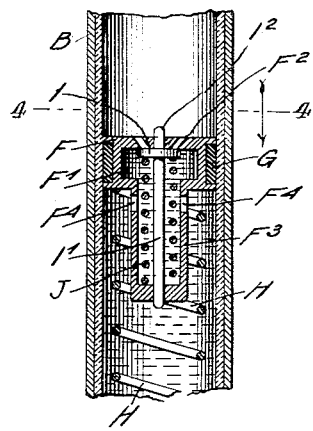
INVENTOR
Henry Pedretti
BY
ATTORNEYS

UNITED STATES PATENT OFFICE.

HENRY PEDRETTI, OF EAST RUTHERFORD, NEW JERSEY, ASSIGNOR TO BECTON, DICKINSON & CO., OF RUTHERFORD, NEW JERSEY.

ASEPTIC INSTRUMENT-CASE.

1,149,941. Specification of Letters Patent. Patented Aug. 10, 1915.

Application filed October 27, 1914. Serial No. 868,831.

*To all whom it may concern:*

Be it known that I, HENRY PEDRETTI, a citizen of the United States, and a resident of East Rutherford, in the county of Bergen and State of New Jersey, have invented a new and Improved Aseptic Instrument-Case, of which the following is a full, clear, and exact description.

The invention relates to instrument cases containing alcohol or other liquid in which a clinical thermometer or other instrument is held immersed when not in use thus keeping the instrument in sterilized condition.

The object of the invention is to provide a new and improved aseptic instrument case, arranged to hold the liquid sealed whenever the instrument is withdrawn from the case, thus preventing loss of the liquid by leakage, evaporation or other causes, and to allow the liquid to surround the instrument on inserting the latter into the case, thus holding the instrument immersed in the liquid while the instrument is not in use.

In order to obtain the desired result, use is made of a plunger or follower, slidable in a tube containing a liquid, and a valve mounted on the said plunger, the valve and the plunger being controlled by the instrument to control the flow of the liquid through the plunger on moving the latter inward or outward in the tube on inserting or withdrawing the instrument.

A practical embodiment of the invention is represented in the accompanying drawings forming a part of this specification, in which similar characters of reference indicate corresponding parts in all the views.

Figure 1 is an enlarged side elevation of the instrument case arranged for containing a clinical thermometer; Fig. 2 is a sectional side elevation of the same with the thermometer partly withdrawn; Fig. 3 is an enlarged sectional side elevation of the plunger and valve in sealing position within the case; and Fig. 4 is a sectional plan view of the same on the line 4—4 of Fig. 3.

A tube A of glass or other suitable material is preferably incased in a metallic casing B provided at its upper end with a cap C having a central, threaded aperture C' in which is adapted to screw a head D carrying a clinical thermometer or other instrument E to be passed through the opening C' into the tube A. The tube A contains alcohol or other liquid in which the lower end of the instrument E is immersed whenever the said instrument is inserted into the tube A and held therein by screwing the head D into the threaded aperture C', as shown in Fig. 1.

Within the tube A is mounted to slide a plunger F provided with a suitable packing G to prevent leakage of the liquid between the peripheral face of the plunger F and the inner surface of the tube A. The under side of the plunger F is pressed on by the upper end of a spring H resting with its lower end on the bottom of the tube A, and the said spring H is so arranged that when the instrument E is withdrawn from the tube A then the spring moves the plunger F upward into the position shown in Fig. 2, that is, to a point about midway between the ends of the tube A. The plunger F is provided with a valve chamber F' having a valve seat $F^2$ leading to the top of the plunger, and this valve seat $F^2$ is adapted to be closed by a valve I extending within the chamber F' and having a stem I', the upper end $I^2$ of which extends through the top of the plunger F to a distance above the said top at the time the valve is seated on the seat $F^2$ (see Fig. 3). The lower end of the valve stem I' is mounted to slide in an extension $F^3$ depending from the plunger F and provided with openings $F^4$ for the passage of the liquid to or from the valve seat $F^2$. A spring J rests with its lower end on the bottom of the extension $F^3$, and the upper end of the said spring presses against the under side of the valve I so as to normally hold the said valve to its seat $F^2$ thus preventing escape of the liquid from the lower end of the tube A at the time the instrument E is withdrawn from the tube A.

When the instrument E is withdrawn from the tube A then the plunger F is in uppermost position, as shown in Fig. 2, with the valve I in closed position so that the liquid is confined in the lower end of the tube A and consequently cannot pass out of the said tube even should the latter be placed in a horizontal or upside down position. When the user passes the instrument E through the aperture C' into the tube A then the lower end of the instrument E finally engages the projecting upper end $I^2$ of the valve stem I' of the valve I, and on pressing the instrument E downward the valve I is moved into open position against the tension of its spring J, and on further pressing the instrument E downward the lower end thereof engages the upper surface of the plunger F to move the latter downward within the tube A. When this takes place, the liquid flows through the apertures F⁴ and the open valve seat F² to the upper face of the descending plunger F and at the same time the spring H is compressed. The operator finally screws the head D into the aperture C' of the cap C so as to hold the instrument in place within the tube A at the same time closing the upper end of the tube A to prevent escape of the liquid from the upper end of the tube A. The instrument case with the instrument in position therein and with the lower end of the instrument immersed in the liquid can now be safely carried in a pocket or other device without danger of the liquid leaking out of the case. When it is desired to use the instrument E the operator simply unscrews the head D to allow the spring H to force the plunger F and with it the instrument E in an upward direction thus permitting an easy withdrawal of the instrument from the tube A. During this upward movement of the plunger F the valve I remains open so as to allow the liquid on top of the plunger F to flow down through the valve seat F² and through the opening F⁴ to the lower face of the plunger F, thus draining all the liquid from the upper face of the plunger F to the lower face thereof. When the instrument is withdrawn the lower end thereof moves out of engagement with the upper end I² of the valve stem I' and consequently the valve I is returned to its seat by the spring J to prevent the liquid from flowing out of the lower end of the tube A during the time the instrument E is withdrawn from the case.

From the foregoing it will be seen that by the arrangement described, the instrument is used to open the valve and to push the plunger downward when inserting the instrument in the case, and when the instrument is withdrawn from the case the plunger returns to its normal uppermost position to allow the liquid to flow through the open valve from the top of the plunger to the bottom thereof, after which the valve I moves to its seat on disengaging the lower end of the instrument from the upper end I² of the valve stem I'.

Having thus described my invention, I claim as new and desire to secure by Letters Patent:

1. An aseptic instrument case, comprising a tube adapted to contain a liquid, a plunger slidable in the said tube, and a valve mounted on the said plunger, the valve and the plunger being controlled by the instrument to control the flow of the liquid through the plunger on moving the plunger inward or outward in the tube on inserting or withdrawing the instrument.

2. An aseptic instrument case, comprising a tube adapted to contain a liquid, a plunger slidable in the said tube, a spring intermediate the bottom of the tube and the said plunger, a valve on the said plunger to control the flow of the liquid from one side of the plunger to the other side thereof, the said valve being adapted to be opened by the instrument, and a spring pressing the said valve to move it into closed position on withdrawing the instrument.

3. An aseptic instrument case, comprising a tube adapted to contain a liquid, a spring-pressed plunger mounted to slide in the said tube and provided with an interior valve seat for the passage of the liquid from one side of the plunger to the other side thereof, and a spring-pressed valve mounted in the said plunger and normally held to the said seat by its spring, the said valve having a valve stem projecting beyond the outer face of the plunger for engagement by the instrument to move the valve off its seat.

4. An aseptic instrument case, comprising a tube adapted to contain a liquid and provided with a threaded cap, a head adapted to screw on the said cap and adapted to carry an instrument, a plunger slidable in the said tube and provided with a valve seat for the passage of the liquid from one side of the plunger to the other side thereof, the plunger having a depending extension provided with openings for the passage of the liquid to and from the said valve seat, a valve controlling the said valve seat and having a stem projecting through the valve seat into the path of the said instrument, a valve spring held in the said extension and pressing the said valve to its seat, and a plunger spring held in the said tube and resting with its lower end on the bottom of the tube, the upper end of the said plunger spring pressing against the under side of the said plunger to move the latter outward in the tube on withdrawal of the instrument, the plunger being located about midway between the ends of the tube at the time the plunger spring is released.

In testimony whereof I have signed my name to this specification in the presence of two subscribing witnesses.

HENRY PEDRETTI.

Witnesses:
   THEO. G. HOSTER,
   M. ROBIN.